United States Patent
Alkhowaildi et al.

(10) Patent No.: US 11,866,644 B1
(45) Date of Patent: Jan. 9, 2024

(54) FRACTURING FLUID BASED ON OILFIELD PRODUCED FLUID

(71) Applicants: SAUDI ARABIAN OIL COMPANY, Dhahran (SA); KING FAHD UNIVERSITY OF PETROLEUM & MINERALS, Dhahran (SA)

(72) Inventors: Mustafa Alkhowaildi, Dhahran (SA); Mohamed Ahmed Nasr El Din Mahmoud, Dhahran (SA); Mohammed Abudullah Bataweel, Dhahran (SA); Rajendra Arunkumar Kalgaonkar, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 17/817,237

(22) Filed: Aug. 3, 2022

(51) Int. Cl.
*C09K 8/68* (2006.01)
*E21B 43/26* (2006.01)

(52) U.S. Cl.
CPC ............ *C09K 8/68* (2013.01); *E21B 43/26* (2013.01)

(58) Field of Classification Search
None
See application file for complete search history.

(56) References Cited

U.S. PATENT DOCUMENTS

| 5,246,073 A * | 9/1993 | Sandiford ............ C09K 8/887 166/295 |
| 10,047,278 B1 * | 8/2018 | Mahmoud .............. C09K 8/88 |
| 10,125,308 B1 | 11/2018 | Mahmoud et al. |
| 11,111,429 B2 | 9/2021 | Waller et al. |
| 2013/0025870 A1 * | 1/2013 | Berry .................. C09K 8/74 507/236 |
| 2013/0213659 A1 * | 8/2013 | Luyster ............... C09K 8/528 507/241 |
| 2019/0390101 A1 * | 12/2019 | Li ....................... C09K 8/665 |

(Continued)

OTHER PUBLICATIONS

Elsarawy et al., "The Effect of Chelating Agents on the Use of Produced Water in Crosslinked-Gel-Based Hydraulic Fracturing," SPE-180215-MS, May 2016, 14 pages. (Year: 2016).*

(Continued)

*Primary Examiner* — Andrew Sue-Ako
(74) *Attorney, Agent, or Firm* — Osha Bergman Watanabe & Burton LLP

(57) ABSTRACT

A composition for a fracturing fluid may include a chelating agent, a polymeric gelling agent, and a base fluid. The base fluid in the fracturing fluid composition may be a produced fluid having a hardness content of at least 7,000 ppm. Method for treating a hydrocarbon-bearing formation may include introducing a fracturing fluid in the hydrocarbon-bearing formation. The fracturing fluid contains a chelating agent, a polymeric gelling agent, and a base fluid. The base fluid may be a produced fluid that has a hardness content of at least 7,000 ppm. The fracturing fluid may have a viscosity of at least 200 cp at 150° F., 100 1/s shear rate, and 300 psia when tested using model 5550 HPHT rheometer. After contacting the hydrocarbon-bearing formation, the viscosity of the fracturing fluid may drop near a range of 1 cP to 5 cP.

12 Claims, 3 Drawing Sheets

(56) References Cited

U.S. PATENT DOCUMENTS

2020/0354627 A1* 11/2020 Kakadjian .............. C09K 8/805

OTHER PUBLICATIONS

Othman et al., "Chelating Agents Usage in Optimization of Fracturing Fluid Rheology Prepared from Seawater," Polymers 2021, 13, 2111, 15 pages.

Kamal et al., "Development of Chelating Agent-Based Polymeric Gel System for Hydraulic Fracturing," Energies 2018, 11, 1663, 15 pages.

* cited by examiner

FRACTURING FLUID BASED ON OILFIELD PRODUCED FLUID

BACKGROUND

Hydraulic fracturing is used in the oil and gas industry to stimulate production in hydrocarbon-containing formations. It is an oil field production technique that involves injecting a pressurized fluid to artificially fracture subsurface formations. The fracturing is created after drilling a well by injecting suitable fluids such as water or chemicals into the well under pressure to induce fractures in a formation. For example, pressurized hydraulic fracturing fluids may be pumped into a subsurface formation to be treated, causing fractures to open in the subsurface formation. The fractures may extend away from the wellbore according to the natural stresses within the formation.

Hydraulic fractures may be generated in the hydrocarbon reservoir by pumping a fluid, often primarily water, from a hydraulic fracturing unit on the surface through the wellhead and the wellbore. When the pressure in the wellbore is sufficiently increased by the pumping of the hydraulic fracturing unit on the surface, hydraulic fractures may be created within the hydrocarbon reservoir. Proppants, such as grains of sand or ceramic beads, may be provided with the pressurized hydraulic fracturing fluid, which may lodge into the hydraulically created fractures to keep the fracture open when the treatment pressure is released. The proppant-supported fractures may provide high-conductivity flow channels with a large area of formation to enhance hydrocarbon extraction.

A variety of fluids have been developed to withstand the high pump rates, shear stresses, and high temperatures and pressures a fracturing fluid may be exposed to. In particular, hydraulic fracturing fluids may be aqueous-based gels, emulsions, or foams. In such hydraulic fracturing fluids, complex chemical mixtures having sufficient viscosity properties may be included to generate fracture geometry in the formation rock and transport solid proppants holding the fracture open. In this context, the viscosity of the hydraulic fracturing fluids may impact the fracture initiation, propagation, and resulting dimensions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a fracturing fluid composition. The fracturing fluid composition may include a chelating agent, a polymeric gelling agent, and a base fluid. The base fluid in the fracturing fluid composition may be a produced fluid having a hardness content of at least 7,000 ppm.

In another aspect, embodiments disclosed herein relate to a method for treating a hydrocarbon-bearing formation. The method may include introducing a fracturing fluid in the hydrocarbon-bearing formation. The fracturing fluid may contain a chelating agent, a polymeric gelling agent, and a base fluid. The base fluid may be a produced fluid that has a hardness content of at least 7,000 ppm. The fracturing fluid may have a viscosity of at least 200 cp at 150° F., 100 1/s shear rate, and 300 psia when tested using model 5550 HPHT rheometer. After contacting the hydrocarbon-bearing formation, the viscosity of the fracturing fluid may drop near a range of 1 cP to 5 cP.

Other aspects and advantages of the claimed subject matter will be apparent from the following description and the appended claims.

DETAILED DESCRIPTION

Figure 1:
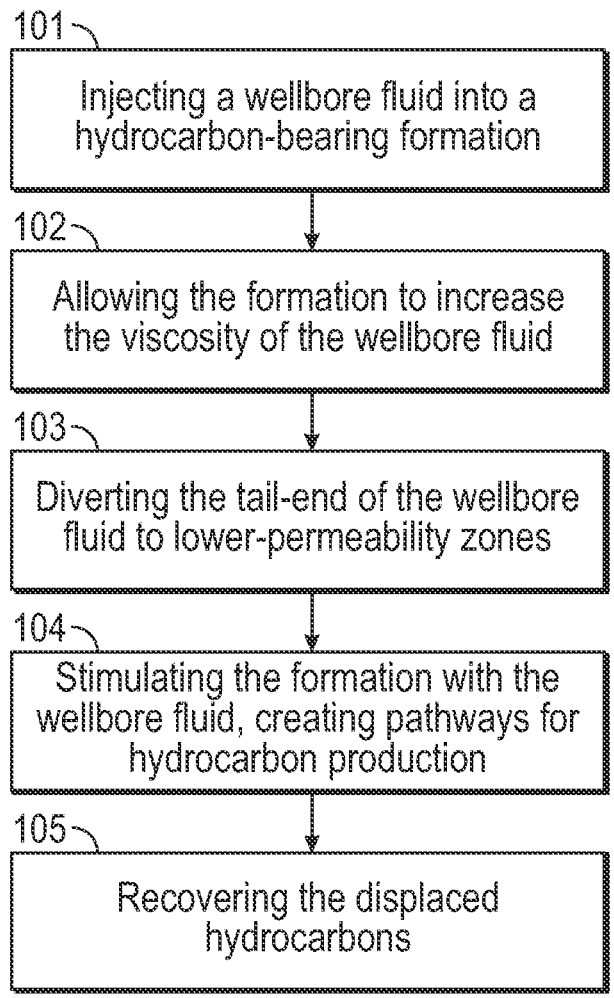
FIG. 1 shows a workflow in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Embodiments in accordance with the present disclosure generally relate to composition and method of making high temperature fracturing fluid formulations and methods of treating the hydrocarbon-bearing formation using the disclosed fracturing fluids. The fracturing fluids may contain at least a chelating agent, a polymeric gelling agent, and a base fluid with a high total dissolved solids content. The fracturing fluids disclosed herein may be particularly useful because they may be made from a produced fluid, which tends to have high salinity and hardness.

The term "chelating agent" is defined as a chemical compound that reacts with metal ions to form stable, water-soluble metal complexes.

The term "polymeric gelling agent" is defined as polymers having a cross-linked polymeric network that can increase the viscosity of a liquid upon dissolving in the liquid. A polymeric gel, or gelling agent, can form a cohesive internal structure when dissolved in a liquid. At substantially high concentrations of dissolved gelling agents, the liquid may exhibit a variety of stimuli-responsive actions, responding to external environmental changes.

The term "produced fluid" is defined as any fluid that is produced from a well in oil and gas operations. The salinity, oil content, dissolved solids, pH can vary from one reservoir to another.

The term "thermal stability" means the ability of a fluid to maintain its chemical and physical characteristics, meaning its ability to resist chemical reactions or changes in the physical state under heat. A molecule with greater stability has more resistance to decomposition at high temperatures.

The term "total dissolved solids" or "TDS" means a measure of the dissolved combined content of all inorganic and organic substances present in a liquid in molecular, ionized, or micro-granular (colloidal sol) suspended form. Unless indicated otherwise, TDS concentrations are reported in parts per million (ppm).

The term "hardness" means a measure of the dissolved calcium carbonate equivalent per unit volume of liquid, more generally, water hardness is a measure of the amount of calcium and magnesium salts in water. Hardness concentrations may be reported in milligrams of calcium carbonate equivalent per liter of liquid (mg/L) or parts per million (ppm).

The term "total salt content" means a measure of the water-soluble chemical compound consisting of an ionic assembly of a positively charged metal cation and a negatively charged anion, which results in a compound with no net electric charge. Total salt content is often reported in parts per million (ppm).

Fracturing Fluid Composition

As noted above, one or more embodiments of the present disclosure relate to a fracturing fluid comprising a chelating agent, a polymeric gelling agent, and produced fluid as an aqueous base fluid. The chelating agent may be glutamate-based.

In one or more embodiments, the chelating agent is tetrasodium glutamate diacetate (GLDA) having a structure represented by Formula (I):

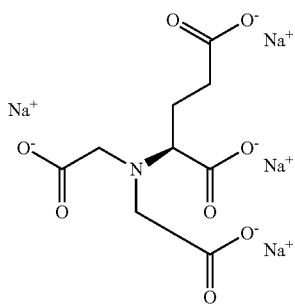

(I)

In one or more embodiments, the chelating agent may be thermally stable at a temperature of 50° F. or more, 100° F. or more, 200° F. or more, or 300° F. or more, as measured by thermogravimetric analysis (TGA). Standard test methods such as ASTM E1131, and ISO11358 may be utilized for measuring the thermal stability of the chelating agent using TGA.

In one or more embodiments, the chelating agent may be highly soluble in aqueous solutions, such as in deionized water, seawater, brines, calcium chloride solutions, and the like. In some embodiments, the chelating agent may be soluble in aqueous solutions in an amount of 0.1% by weight (wt. %) or more, 1 wt. % or more, 10 wt. % or more, or 30 wt. % or more at ambient temperature. In some embodiments, the solubility of the chelating agent may increase with increasing temperature, until gelation occurs.

As noted above, the fracturing fluid also includes a polymeric gelling agent. In one or more embodiments, the polymeric gelling agent may be a guar gum derivative. In one or more embodiments, the polymeric gelling agent may be selected from one of the groups consisting of hydroxypropyl guar gum (HPG), carboxymethyl hydroxypropyl guar gum (CMHPG, as shown below), guar gum, carboxymethyl cellulose, carboxyethyl cellulose, polyacrylamide, and its derivatives and copolymers, and combinations thereof.

In one or more particular embodiments, the polymeric gelling agent is carboxymethyl hydroxypropyl guar gum (CMHPG) with typical degrees of substitution in industrial applications.

The polymeric gelling agent having a generic structure represented by Formula (II):

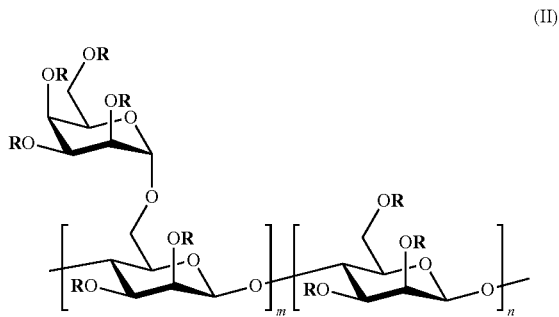

(II)

where R is carboxymethyl hydroxypropyl (CMHP), m is 1 to 2000, and n is 1 to 2000. An example of a commercially available material in accordance with formula (II) is a CMHPG having a CAS number of 68130-15-4. The typical degrees of substitution in industrial applications in CMHPG structure may be as follows: DSGal=0.4-0.6, DSCM=0.02-0.08 and MSHP=0.1-0.5, where DSGal is the average degree of substitution of d-galactopyranosyl units, DSCM is the average degree of substitution of carboxymethyl groups and MSHP is the molar degree of substitutions of hydroxypropyl groups. CMHPG as used herein may be an anionic guar derivative as a sodium salt that may commonly be used as a gelling agent or viscosity modifier for oil and gas hydraulic fracturing fluids to suspend proppant. CMHPG may be easily soluble in cold temperatures and may exhibit thermal stability under conventional oil and gas operational conditions.

In one or more embodiments, the polymeric gelling agent may be thermally stable at a temperature of 50° F. or more, 100° F. or more, 200° F. or more, or 300° F. or more, as measured by thermogravimetric analysis (TGA).

In one or more embodiments, the polymeric gelling agent may be highly soluble in aqueous solutions, such as in deionized water, seawater, brines, calcium chloride solutions, and the like. In some embodiments, the polymeric gelling agent may be soluble in aqueous solutions in an amount of 0.1% by weight (wt. %) or more, 1 wt. % or more, 10 wt. % or more, or 30 wt. % or more at ambient temperature. In some embodiments, the solubility of the polymeric gelling agent may increase with increasing temperature, until gelation occurs.

In one or more embodiments, the fracturing fluid composition comprises 1.0 to 20 vol. % of the chelating agent. For example, the fracturing fluid may contain the chelating agent in an amount ranging from a lower limit of any of 1, 2, 3, 4, 5, 8, and 10 vol. % to an upper limit of any of 12, 14, 16, 18 and 20 vol. %, where any lower limit can be used in combination with any mathematically compatible upper limit.

In one or more embodiments, the fracturing fluid composition comprises 0.01 to 0.1 pounds (lb)/gallons (gal) of the polymeric gelling agent. For example, the fracturing fluid may contain the polymeric gelling agent in an amount ranging from a lower limit of any of 0.01 lb/gal to an upper limit of any of 0.1 lb/gal, where any lower limit can be used in combination with any mathematically compatible upper limit.

In one or more embodiments, the produced fluid may have a total dissolved solids content in an amount of at least 55,000 ppm, or at least 60,000 ppm, or at least 70,000 ppm, or at least 80,000 ppm, or at least 90,000 ppm, or at least 100,000 ppm.

In one or more embodiments, the produced fluid may have a hardness content in an amount of at least 2,500 ppm, or at least 5,000 ppm, or at least 7,000 ppm, or at least 8,000 ppm, or at least 9,000 ppm, or at least 10,000 ppm.

In one or more embodiments, the produced fluid may have a high salt content. The produced fluid may include at least one of freshwater, seawater, brine, water-soluble organic compounds, water-insoluble materials, and mixtures thereof. The aqueous fluid may contain wastewater containing various salts. The salts may include but are not limited to, alkali metal halides and hydroxides. In one or more embodiments, brine may be any of seawater, aqueous solutions wherein the salt concentration is less than that of seawater, or aqueous solutions wherein the salt concentration are greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the mentioned salts may be included in brine.

In one or more embodiments, the produced fluid may have total salt content in an amount of at least 10,000 ppm, or at least 50,000 ppm, or at least 75,000 ppm.

In one or more embodiments, the fracturing fluids of one or more embodiments may include one or more acids. Acids may be particularly included when the fracturing fluid is to be used in a matrix stimulation process, as described below. The acid may be any suitable acid known to a person of ordinary skill in the art, and its selection may be determined by the intended application of the fluid. In some embodiments, the acid may be one or more selected from the group consisting of hydrochloric acid, sulfuric acid, carboxylic acids such as acetic acid, and hydrofluoric acid. In some embodiments, the hydrofluoric acid may be included as a hydrogen fluoride source, such as ammonium fluoride, ammonium bifluoride, fluoroboric acid, hexafluoro phosphoric acid, and the like The fracturing fluid of one or more embodiments may comprise one or more acids in a total amount of the range of about 0.01 to 30.0 wt. %. For example, the fracturing fluid may contain the acids in an amount ranging from a lower limit of any of 0.01, 0.05, 0.1, 0.5, 1.0, 5.0, 10, 15, 20, and 25 wt. % to an upper limit of any of 0.5, 1.0, 5.0, 10, 15, 20, 25, and 30 wt. %, where any lower limit can be used in combination with any mathematically-compatible upper limit.

In one or more embodiments, the fracturing fluids of one or more embodiments may include one or more additives. The additives may be any conventionally known and one of ordinary skill in the art will, with the benefit of this disclosure, appreciate that the selection of said additives will be dependent upon the intended application of the fracturing fluid. For instance, if the fracturing fluid is to be used as a fracturing fluid, it may comprise a proppant such as sand. In some embodiments, the additives may be one or more selected from clay stabilizers, scale inhibitors, corrosion inhibitors, biocides, friction reducers, thickeners, and the like.

The fracturing fluid of one or more embodiments may comprise one or more additives in a total amount of the range of about 0.01 to 15.0 wt. %. For example, the fracturing fluid may contain the additives in an amount ranging from a lower limit of any of 0.01, 0.05, 0.1, 0.5, 1.0, 2.5, 5.0, 1.5, 10.0, and 12.5 wt. % to an upper limit of any of 0.1, 0.5, 1.0, 2.5, 5.0, 7.5, 10.0, 12.5, and 15.0 wt. %, where any lower limit can be used in combination with any mathematically-compatible upper limit.

In one or more embodiments, the fracturing fluid may have a density that is greater than 0.90 g/cm$^3$. For example, the fracturing fluid may have a density that is of an amount ranging from a lower limit of any of 0.90, 0.95, 1.00, 1.05, 1.10, 1.15, and 1.20 g/cm$^3$ to an upper limit of any of 1.00, 1.05, 1.10, 1.15, 1.20, and 1.25 g/cm$^3$, where any lower limit can be used in combination with any mathematically-compatible upper limit. The density of the fracturing fluids according to one or more embodiments may vary significantly, depending on the composition, and external factors such as temperature and pressure.

In one or more embodiments, the density of the fracturing fluid may be controlled by increasing any of these elements in the fluid: chelating agent, polymeric gelling agent, salt content, hardness content, and total dissolved solids content.

In one or more embodiments, the fracturing fluid may have a viscosity at 150° F. and 300 psia at a time ranging from 0.1 to 2 hours which is of the range of about 1 to 50 cP. For an example, in between time 0.1 to 2 hours, the fracturing fluids may have a viscosity at 150° F. and 300 psia of 50 cP or less, 20 cP or less, 10 cP or less, 5 cP or less, or 2 cP or less. Unless indicated otherwise, all viscosities described herein were measured over variable shear rates ranging from 1-200 s$^{-1}$ a temperature range from 50° F., and 300° F. All viscosities reported are measured using a model 5550 HPHT rheometer.

In one or more embodiments, the fracturing fluid may have a viscosity at 150° F. and 300 psia at a time ranging from 2 to 5 hours which is of the range of about 100 to 300 cP. In some embodiments, the fracturing fluids may have a viscosity at 150° F. and 300 psia of 100 cP or more, 150 cP or more, 200 cP or more, 250 cP or more, or 300 cP or more.

In one or more embodiments, the viscosity of the fracturing fluid may decrease after passing through a wellbore and contacting a hydrocarbon in a reservoir. For example, after traveling through the well at a high pressure and temperature for 2 hours and contacting hydrocarbons in the reservoir, the fracturing fluid may have a viscosity at 150° F. that is similar to the viscosity of water at that temperature and pressure. The viscosity of the fracturing fluid then may range from 1 to 20 cP.

In one or more embodiments, the fracturing fluid may have a pH that is neutral or acidic. For example, the fracturing fluid may have a pH ranging from a lower limit of any of 2, 3, 4, 4.5, 5, 5.5, and 6, to an upper limit of any of 3, 4, 4.5, 5, 5.5, 6, 6.5, and 7, where any lower limit can be used in combination with any mathematically-compatible upper limit. In some embodiments, the fracturing fluid may have a pH of 7 or less, of 6 or less, of 5 or less, of 4 or less, or 3 or less.

In one or more embodiments, the fracturing fluid may be stable under certain conditions. The fracturing fluid may be stable at a temperature of at least 250° F. For a non-limiting example, the fracturing fluid may be stable at a temperature of at least 250° F., or at least 275° F., or at least 300° F., or at least 320° F. In one or more embodiments, the fracturing fluid may be stable at a pressure of at least 400 psi. For a non-limiting example, the fracturing fluid may be stable at a pressure of at least 400 psi, or at least 425 psi, or at least 450 psi, or at least 475 psi.

Method of Stimulating a Well with Fracturing Fluid

The methods of one or more embodiments may be used for well stimulation. A well stimulation process in accordance with one or more embodiments of the present disclosure is depicted by and discussed with reference to, FIG. 1. Specifically, in step 101, the fracturing fluid may be injected into a hydrocarbon-bearing formation at an injection well. In some embodiments, the injection of the fracturing fluid may be performed at a pressure that is below the fracturing pressure of the formation. In step 102, a zone within the formation may be at a high temperature and increase the viscosity of the fracturing fluid. In step 103, after the increase in viscosity, the tail-end of the fluid is diverted to lower-permeability zones of the formation, displacing hydrocarbons. This results from the increase in viscosity that may "plug" the more permeable zones of the formation. In step 104, the formation is stimulated by the fracturing fluid, creating pathways for hydrocarbon production. In step 105, the displaced hydrocarbons may be recovered through the stimulated reservoir. In one or more embodiments, the hydrocarbons may be recovered at a production well.

The well stimulation process of one or more embodiments may be a matrix stimulation process. In the matrix stimulation process of one or more embodiments, the fracturing fluid, or one of the stimulation fluids, contains an acid. The acid fluid may react with the formation, dissolving rock, and creating wormholes that create a pathway for hydrocarbons to be displaced from deeper within the rock.

In one or more embodiments, the fracturing fluid may increase in viscosity in the formation, enabling the fluid to better penetrate lower-permeability zones of the formation and allowing the acid to react with the entire formation more uniformly. This may provide for the formation of deeper wormholes and enhance the overall permeability of the near-wellbore region. In the absence of this viscosity increase, the fluid may primarily penetrate the high permeability zones.

In one or more embodiments, the well stimulation process may be repeated one or more times to increase the amount of hydrocarbons recovered. In some embodiments, subsequent well stimulation processes may involve the use of different amounts of the chelating agent and/or different chelating agents than GLDA in the fracturing fluid composition. In some embodiments, subsequent well stimulation processes may involve the use of different amounts of the polymeric gelling agent and/or different polymeric gelling agent than CMHPG in the fracturing fluid composition. The methods of one or more embodiments may advantageously provide improved sweep efficiency.

One or more embodiments of the present disclosure are directed to fracturing fluids. The fracturing fluids of one or more embodiments may include, for example, water-based fracturing fluids. The fracturing fluids may be acid stimulation fluids or EOR fluids or among others.

In one or more embodiments, 150° F. was tested and found to be the minimum temperature required in the absence of any additional breaker additive to aid the fracturing fluid breaking mechanism.

Embodiments of the present disclosure may provide at least one of the following advantages. The additives described herein are biodegradable and environment friendly, which is advantageous for cleanup behavior. As noted above, the inventive formulation includes water, a polymeric gelling agent, and a chelating agent. As an example, this formulation includes GLDA as a chelating agent that can replace numerous additives in conventional formulations, making the overall formulation simpler and more cost-effective to use. Non-limiting examples of such additives may be conventional cross-linkers and breakers. In one or more embodiments, GLDA may have advantages over other chelating agents as a chelating agent in the fracturing fluid composition. GLDA may be used as a thickening agent and a breaker at the same time. GLDA may also be non-damaging to the formation and the equipment used in fracturing applications. Commonly, hydraulic fracturing operations rely on freshwater resources. With this formulation, wastewater or produced fluid can be utilized as a viable base fluid source instead of freshwater resources. Wastewater or produced fluid are commonly discarded after oil and gas operations.

EXAMPLES

The following examples are provided to illustrate embodiments of the present disclosure. The Examples are not intended to limit the scope of the present invention, and they should not be so interpreted.

Materials

The chelating agent used in the EXAMPLE 1 is a water miscible, glutamic acid N, N-diacetic acid (GLDA) having a commercial name Dissolvine® StimWell™. The chemical formula of GLDA used is $C_9H_{13}NO_8$ (CAS No. 58976-65-1) and was manufactured by Nouryon.

The polymeric gel used in the EXAMPLE 1 is carboxymethyl hydroxypropyl guar (CMHPG) polymer blended with 60-70% of Fuels diesel, no. 2 (CAS No. 68476-34-6) having a commercial name of XLFC-3B. The CMHPG used was manufactured by Baker Hughes and has a density of 9.08 pounds per gallon (lbs/gal).

Example 1

To prepare fracturing fluid, the chelating agent is first dissolved in the base fluid. Next, a polymeric gelling agent is added to the base fluid and mixed. After mixing the chelating agent and polymeric gelling agent in the base fluid utilizing standard mixing equipment, such as blender under ambient conditions, at least 10-15 minutes of hydration time was given for the composition to combine in a single-phase fluid. The addition of polymeric gelling agents results in the thickening of the fluid. The corresponding concentration of the components in the fluid composition is shown in Table 1.

TABLE 1

| Additive | Concentration |
|---|---|
| Polymer (CMHPG) | 50 lb/1000 gal |
| GLDA | 10% volume |

The fracturing fluid in this given example contains produced fluid that has NaCl, $CaCl_2.2H_2O$, and $MgCl_2.2H_2O$ concentrations as shown in Table 2.

TABLE 2

| Salts | Concentration (g/L) |
|---|---|
| NaCl | 48.6 |
| $CaCl_2 \cdot 2H_2O$ | 22 |
| $MgCl_2 \cdot 6H_2O$ | 8.4 |

Figure 2:
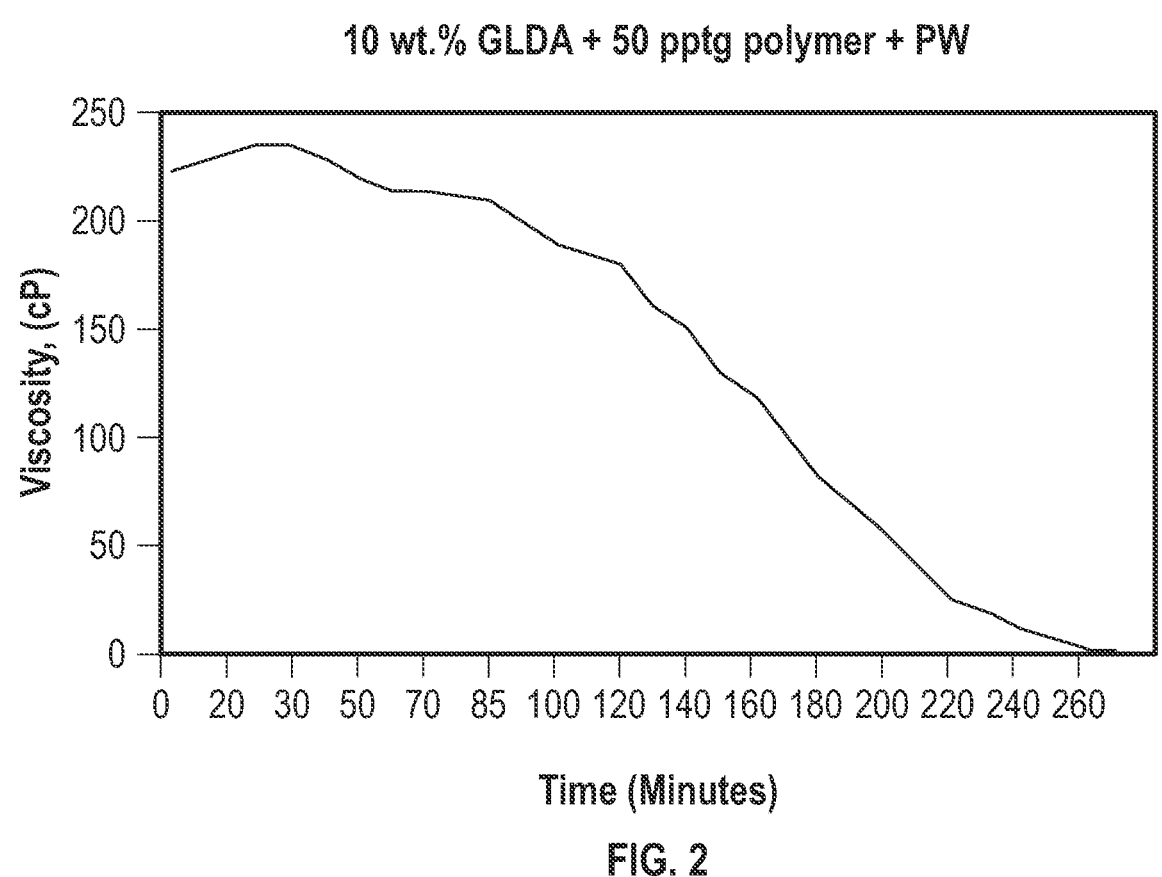
FIG. 2 is a graph of the viscosity profile of a fracturing fluid example in relation to the time at 150° F., 100 s$^{-1}$ shear rate, and 300 psia pressure.

FIG. 2. shows the viscosity profile of the fracturing fluid of example 1 in relation to the time. The fracturing fluid composition consists of 10 vol. % GLDA, 50 lb/1000 gal of CMHPG, and produced fluid. The viscosity of the fracturing fluid reduces from 250 cP to 1 cP in about 250 minutes.

Figure 3:
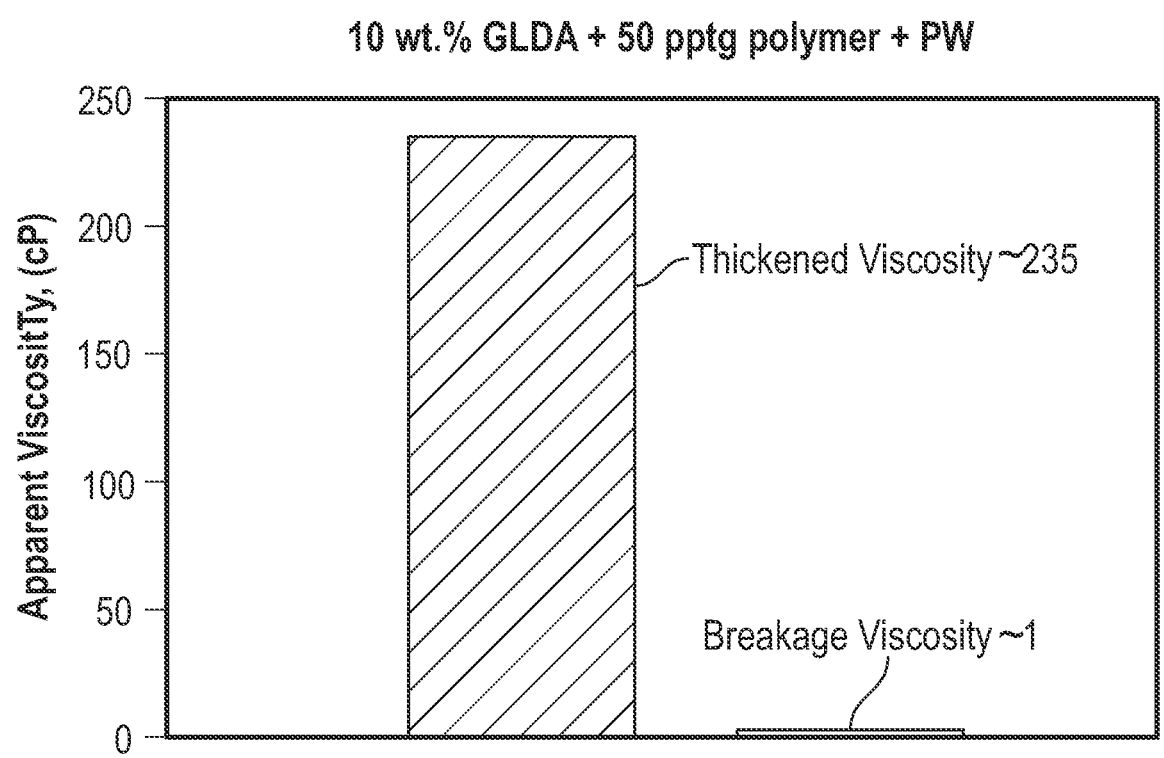
FIG. 3 is a graph of the viscosity drop of a fracturing fluid example from 235 cP to 1 cP in 4 hours at 150° F., 100 s$^{-1}$ shear rate, and 300 psia pressure.

FIG. 3 shows the viscosity drop of the fracturing fluid of example 1 over time. The fracturing fluid composition is prepared at 150° F., 100 $s^{-1}$ shear rate, and 300 psia pressure. At the beginning of the experiment, the viscosity of the fracturing fluid is 235 cP. After mixing for 4 hours at 150° F., 100 $s^{-1}$ shear rate, and 300 psia pressure, the fracturing fluid viscosity drops close to 1 cP.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A fracturing fluid composition comprising:
   0.1 to 20 vol. % of a glutamate-based chelating agent;
   0.1 to 20 vol. % of a guar gum derivative polymeric gelling agent; and
   a base fluid; wherein the base fluid is produced fluid having a hardness content of at least 7,000 ppm,
   wherein the fracturing fluid has a pH of 7 or less.

2. The fracturing fluid composition according to claim 1, wherein the chelating agent is tetrasodium glutamate diacetate (GLDA) having a structure represented by Formula (I):

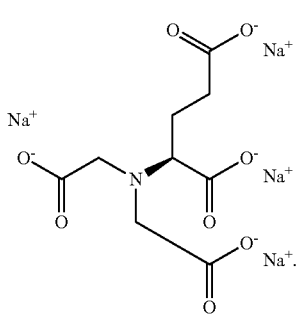

(I)

3. The fracturing fluid composition according to claim 1, wherein the polymeric gelling agent is a guar gum derivative having a structure represented by Formula (II):

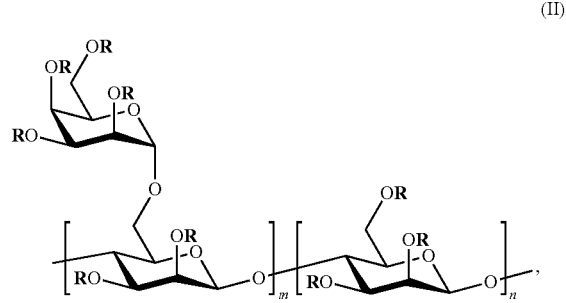

(II)

wherein R is H, hydroxypropyl, or carboxymethyl hydroxypropyl, m is 1 to 2000, and n is 1 to 2000.

4. The fracturing fluid composition according to claim 1, wherein the base fluid has a total dissolved solids (TDS) of at least 70,000 ppm.

5. The fracturing fluid composition according to claim 1, wherein the fracturing fluid composition has an initial viscosity of at least 200 cp at 150° F., 100 1/s shear rate, and 300 psia when tested using model 5550 HPHT rheometer.

6. The fracturing fluid composition according to claim 1, wherein the fracturing fluid composition has a viscosity of from 1 cP to 50 cP at 150° F. and 300 psia pressure after undergoing a shear rate of at least 100 1/s for at least 2 hours.

7. A method of treating a hydrocarbon-bearing formation comprising:
   introducing a fracturing fluid in the hydrocarbon-bearing formation, the fracturing fluid comprising:
   0.1 to 20 vol. % of a glutamate-based chelating agent;
   0.1 to 20 vol. % of a guar gum derivative polymeric gelling agent; and
   a base fluid; wherein the base fluid is produced fluid having a hardness content of at least 7,000 ppm,
   wherein the fracturing fluid has a pH of 7 or less, and
   wherein the fracturing fluid has a viscosity of at least 200 cp at 150° F., 100 1/s shear rate, and 300 psia when tested using model 5550 HPHT rheometer, and after contacting the hydrocarbon-bearing formation, the viscosity of the fracturing fluid drops near a range of 1 cP to 5 cP.

8. The method of treating a hydrocarbon-bearing formation according to claim 7, wherein the chelating agent is tetrasodium glutamate diacetate (GLDA) having a structure represented by Formula (I):

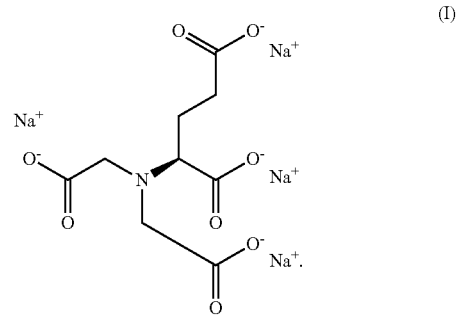

(I)

9. The method of treating a hydrocarbon-bearing formation according to claim 7, wherein the polymeric gelling agent is a guar gum derivative having a structure represented by Formula (II):

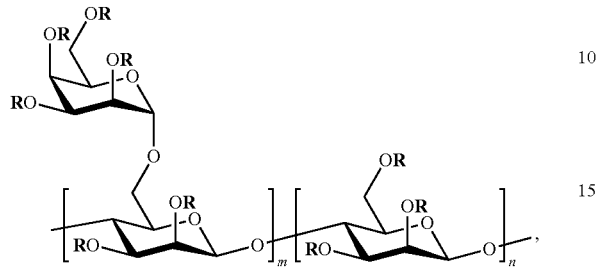

wherein R is H, hydroxypropyl, or carboxymethyl hydroxypropyl, m is 1 to 2000, and n is 1 to 2000.

10. The method of treating a hydrocarbon-bearing formation according to claim 7, wherein the base fluid has total dissolved salt (TDS) of at least 70,000 ppm.

11. The method of treating a hydrocarbon-bearing formation according to claim 7, wherein the fracturing fluid has a viscosity of from 1 cP to 50 cP at 150° F. and 300 psia pressure after undergoing a shear rate of at least 100 1/s for at least 2 hours.

12. The method of treating a hydrocarbon-bearing formation according to claim 7, further comprises recovering hydrocarbons from the hydrocarbon-bearing formation.

* * * * *